(No Model.)

N. WASHBURN.
CAR WHEEL.

No. 254,250.  Patented Feb. 28, 1882.

Witnesses
S. N. Piper.

Inventor.
Nathan Washburn.
by R. H. Eddy atty

UNITED STATES PATENT OFFICE.

NATHAN WASHBURN, OF ALLSTON, MASSACHUSETTS.

CAR-WHEEL.

SPECIFICATION forming part of Letters Patent No. 254,250, dated February 28, 1882.

Application filed May 23, 1881. (No model.)

*To all whom it may concern:*

Be it known that I, NATHAN WASHBURN, of Allston, of the county of Suffolk and State of Massachusetts, have invented a new and useful Improvement in Railway-Car Wheels; and I do hereby declare the same to be described in the following specification and represented in the accompanying drawings, of which—

Figure 1:
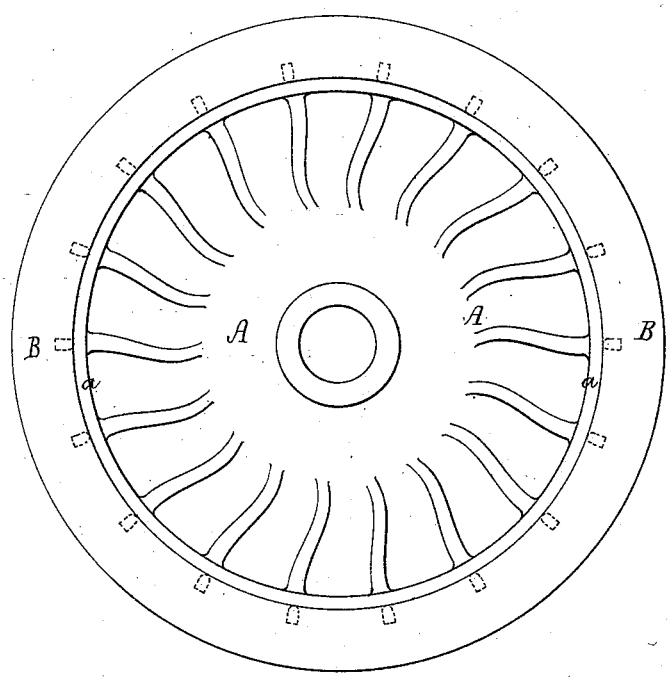
Figure 2:
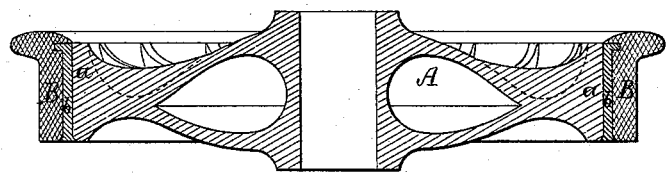
Figure 3:
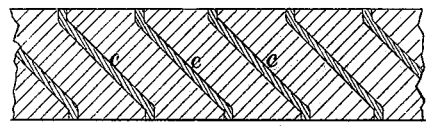

Figure 1 is a side view, and Fig. 2 a transverse section, of a car-wheel made in accordance with my invention, which relates to car-wheels having cast-iron bodies and steel tires united in the process of casting or founding the bodies. Fig. 3 denotes a sectional view of the rim, showing the oblique positions of the wrought-iron re-enforces.

Wheels of this character, while in use, are liable, after they may have become grooved or worn down on their treads, to become split or cracked lengthwise in their tires, in which case the wheel-rim, united to the tire and being of cast-iron, is in danger of being broken under the blows received by the tire, the consequence being that on a breakage of this kind taking place the tire, not being properly sustained by the rim, is apt in most, if not all, cases to become broken away more or less, thereby being occasionally, if not frequently, productive of serious accident.

In carrying out my invention I combine with the cast-iron wheel-body and its steel tire re-enforces to strengthen the rim laterally, so as to prevent it from being cracked lengthwise or widthwise of it.

In the drawings, A denotes the cast-iron body, and B the cast-steel tire. The rim with which the tire is united is shown at *a*. In this rim, and extending through it transversely and in close contiguity with the tire, is a series of wrought-iron re-enforces, *b*, each consisting of a short bar or rod usually headed at each end, or screw-threaded from end to end, or grooved transversely. They are disposed at equal distances apart within the rim, which generally is cast upon them duly arranged in the mold for casting the wheel-body, though they may be otherwise inserted and fixed in the wheel-rim. When screw-threaded, or provided with numerous grooves extending wholly or partially around the re-enforce, it becomes a better supporter of the tire than it is when simply upset or headed on either or each end.

I am aware that in making car-wheels it has, before my invention, been customary to interpose between the steel tire and the cast-iron body or rim a band, ring, or layer of wrought-iron to encompass the rim, and have both the rim and tire cast against it, (the said wrought-iron ring,) all of which differs very materially from my invention, wherein a series of metallic re-enforces or rods of wrought-iron are used within the rim, such re-enforces being arranged obliquely in the rim, as represented. These re-enforces do not wholly insulate the metal of the tire from that of the rim, as is the case with a ring or band of wrought-iron arranged with the tire and rim, and connected therewith in manner as shown in the United States Patent No. 133,738; but they allow of the wheel body or rim being cast directly against the steel tire, all being accomplished by one operation, whereas when a ring of wrought-iron is combined with a wheel tire and body, as set forth in the said patent, two operations of casting become necessary at one and the same time—that is to say, the molten steel designed for the tire is cast around the outer side of the ring, the metal to form the body being at the same time cast within and against the ring. Furthermore, my invention differs materially from that shown in the United States Patent No. 122,538, which consists of a wheel having a body of soft cast-iron, a tread or wearing-surface, of suitable thickness, of hard or white cast-iron, and a thin annulus interposed between the two, it being thin enough to be rendered fluid by the heat of the cast metal surrounding it before such metal becomes set or solidified, the two kinds of the cast-iron being simultaneously poured into the mold. In this wheel the tread portion becomes practically separated from the rim or body portion by the interposed thin ring or circular partition, whereas in my wheel, in which the tire is of cast-steel, the tire and body or rim are directly united in the process of casting, the re-enforces being in the rim and serving to sustain it against cracking in the tire, as hereinbefore stated. In the British Patent No. 12,878 for 1849 a wheel is described as having wrought-iron spokes and a cast-iron rim, each of the spokes being bent at, or about at, a right angle, and extended along within the rim to, or nearly to, the next spoke, all of which differs from my wheel, for the said patented wheel has no cast-steel tire united with the cast-iron body in the process of casting the latter, and, besides, the part of each spoke which is within the rim does not go through the rim, either transversely or obliquely, but is arranged only longitudinally therein, and consequently cannot support the rim, as does a re-enforce of the kind used in my improved wheel.

I claim—

1. In combination with a railway-car wheel having its body of cast iron and its tire of steel, and united to the rim in the process of casting the body, a series of wrought-iron bars or re-enforces arranged obliquely, as described, in the tire, the latter being cast upon them, as set forth.

2. In combination with a railway-car wheel having its body of cast-iron and its tire of steel, and united to the rim in the process of casting the latter, a series of wrought-iron re-enforces, substantially as described, arranged in the body or rim and in close contiguity with the tire, all essentially as and for the purpose specified.

3. A car-wheel made of cast iron or metal, and having within its rim wrought-iron bars or re-enforces arranged therein obliquely, the metal of the part containing them being cast upon such re-enforce in the process of making the wheel.

NATHAN WASHBURN.

Witnesses:
R. H. EDDY,
E. B. PRATT.